(12) United States Patent
Itoh et al.

(10) Patent No.: US 6,527,179 B1
(45) Date of Patent: Mar. 4, 2003

(54) BAR-CODE READER AND CONTROLLING METHOD THEREFOR

(75) Inventors: Motohiko Itoh, Kawasaki (JP); Mitsuharu Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/464,774

(22) Filed: Dec. 16, 1999

(30) Foreign Application Priority Data

Jun. 30, 1999 (JP) .......................................... 11-186272

(51) Int. Cl.⁷ ................................................ G06K 7/10
(52) U.S. Cl. .............................. 235/462.01; 235/462.18
(58) Field of Search ......................... 735/462.01, 462.1, 735/462.15, 462.18

(56) References Cited

U.S. PATENT DOCUMENTS 6,200,628 B1 * 3/2001 Watanabe et al.

FOREIGN PATENT DOCUMENTS

| JP | 58-221468 | 12/1983 |
| JP | 59-208674 | 11/1984 |
| JP | 61-123975 | 6/1986 |
| JP | 63-266585 | 11/1988 |
| JP | 04-192071 | * 7/1992 |
| JP | 5-12480 | 1/1993 |
| JP | 8-147403 | 6/1996 |

* cited by examiner

Primary Examiner—Diane I. Lee
(74) Attorney, Agent, or Firm—Armstrong, Westerman & Hattori, LLP

(57) ABSTRACT

In a bar-code reader in a POS system, bar-code data is compared with the just previously read bar-code data to detect whether they are identical or not, and if the bar-code data is not identical to the just previously read bar-code data, the bar-code data is transmitted to a station host and, at the same time, a notification is produced to indicate that the bar-code data has been transmitted. If they are identical, and if a double reading prevention timer is not ON, the bar-code data is transmitted to the station host and, at the same time, a notification is produced to signify that the bar-code data has been transmitted; on the other hand, if the double reading prevention timer is ON, the bar-code data is discarded, and a notification signifying the discarding of the data is produced with different sounds from that used for the transmission notification. When treading a bar code attached to a product, this feature allows the operator to know what to do next when the same product as the immediately previous one is scanned during the ON period of the double reading prevention timer activated to prevent double reading of the same product. This alleviates an operator's stress when performing the reading operation.

7 Claims, 6 Drawing Sheets

BAR-CODE READER AND CONTROLLING METHOD THEREFOR

BACKGROUND OF THE INVENTION

1. Field of the Invention

The present invention relates to a bar-code reader for reading bar codes using reflection of light and a controlling method therefor, and more particularly to a bar-code reader, and a controlling method therefor, used in a POS system in which bar codes are read at supermarket checkout counters, etc. from bar-code labels attached to products and other items, and billing and other processing operations are performed based on the thus read bar-code data.

2. Description of the Related Art

In such a POS system, a POS station terminal is installed at the checkout counter. A bar-code reader (bar-code scanner) for reading bar codes from bar-code labels attached to products and other items is connected by a cable to the POS station terminal, and the CPU contained in the POS station terminal processes the data read by the bar-code reader and controls the keyboard, display, printer, etc.

The bar-code reader comprises a light source which emits a laser beam or the like, an optical device which receives light reflected from a bar-code label and converts it into an electrical signal, and a converter which performs conversion to bar-code data based on the electrical signal.

When billing a purchased item, for example, at a supermarket checkout counter using such a POS system, first the operator brings the bar-code label attached to the purchased item into the reading area of the optical device. Thereupon, the optical device receives light reflected from the bar-code label, then this optical received signal is read and converted into a digital form within the bar-code reader, and the resulting bar-code data is decoded.

When the thus read bar code is identified as the first bar code which is completely read, the bar-code reader transmits the bar-code data to the POS station terminal for billing. At this time, a speaker contained in the bar-code reader produces a short beep tone signifying that the bar-code data has been transmitted to the POS station terminal.

The bar-code reader is equipped with a double reading prevention timer to prevent the same bar-code data being read during a predetermined period of time. If, during the time period of this double reading prevention timer, it is judged that the newly read bar-code data is identical to the just previously read bar-code data, the newly read bar-code data is discarded. However, since the operator does not know that the bar-code data of the newly read bar code has been discarded, the operator continues to perform the reading operation for the bar code in the bar-code reading area, trying to have the bar-code reader read the bar code.

When reading the current bar code by the bar-code reader after reading the previous bar code, if the bar codes are different from each other, no problems occur in the operator's bar-code reading operation, but when trying to read the same bar code as the just previously read one at this time, the above-described feature poses a problem in the operator's operation.

The longer the predetermined time period of the timer, the greater the probability of the same product being decoded twice, and the more effective the double reading prevention feature of the bar-code reader; however, if the time period is too long, the operator may erroneously take it that the reading sensitivity is poor, and may try to perform the operation over and over again, since there is no knowing whether the bar code has been decoded successfully. This imposes a considerable stress on the operator. To avoid this, the user sets the time period of the double reading prevention feature to such a length that does not cause a problem in operation. However, setting the time period short will make it difficult for the operator to know whether the double reading prevention feature is working or not, and in this case also, the operator will end up trying to perform the reading operation over and over again.

SUMMARY OF THE INVENTION

It is, accordingly, an object of the present invention to reduce a burden on an operator in a bar-code reading operation by making the operator realize that he has to wait, when the same product as the immediately previous product is scanned when the double reading timer is activated.

To solve the above problem, the present invention provides a bar-code reader in a POS system in which a signal obtained by receiving light reflected from a bar-code label is converted into bar-code data and the bar-code data is decoded and transmitted to a station host, wherein the bar-code data is compared with the just previously read bar-code data to determine whether they are identical or not; if the bar-code data is identical to the previous bar-code data, and if a double reading prevention timer is not ON, the bar-code data is transmitted to the station host and, at the same time, a speaker is caused to produce a sound to notify the transmission, but if the double reading prevention timer is ON, the bar-code data is discarded, and a notification signifying the discarding of the data is produced with a higher sound than that used for the transmission notification.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENT

Before describing the embodiments of the present invention, the related art and the disadvantages therein will be described with reference to the related figures.

Figure 1:
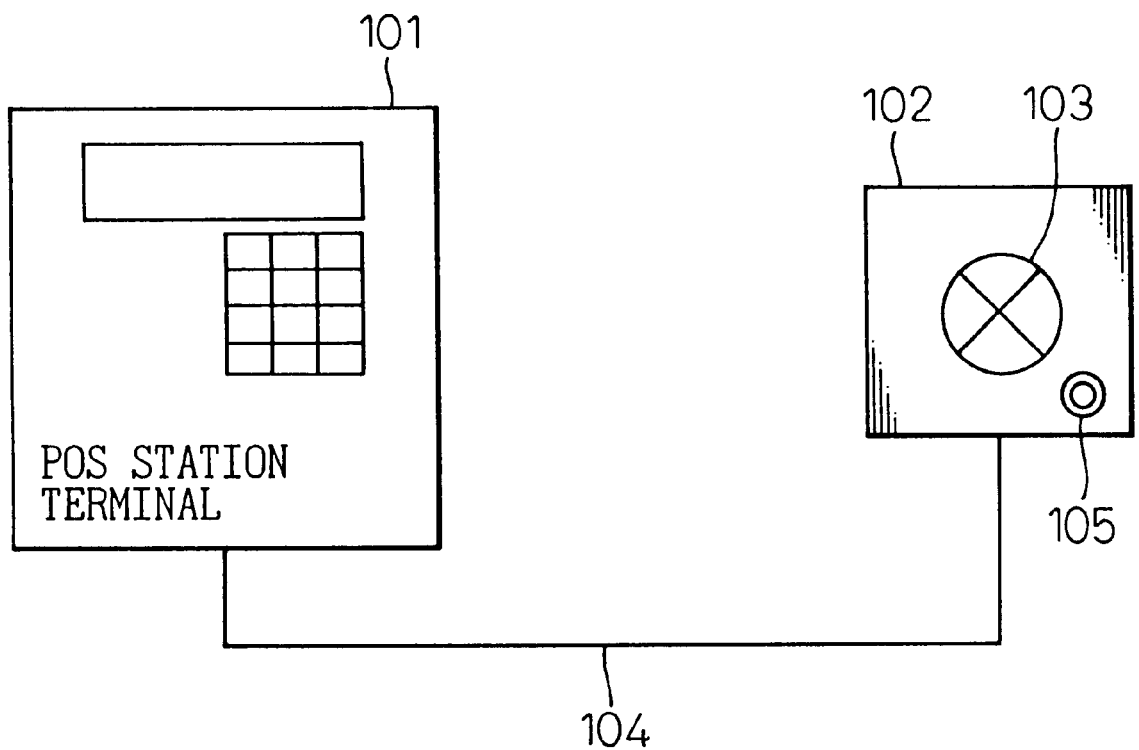
FIG. 1 is a diagram showing in simplified form the configuration of a POS system containing a bar-code reader relating to the present invention.

FIG. 1 shows in simplified form the configuration of the above described POS system used at a supermarket checkout counter or the like. A bar-code reader (bar-code scanner) 102 for reading bar codes from bar-code labels attached to products and other items is connected by a cable 104 to a POS station terminal 101. The POS station terminal 101 includes a CPU as a host which processes data read by the bar-code reader 102 and controls the keyboard, display, printer, etc. The bar-code reader 102 comprises a light source which emits a laser beam or the like, an optical device 103 which receives light reflected from a bar-code label and converts it into an electrical signal, and a converter which performs conversion to bar-code data based on the electrical signal.

Figure 2:
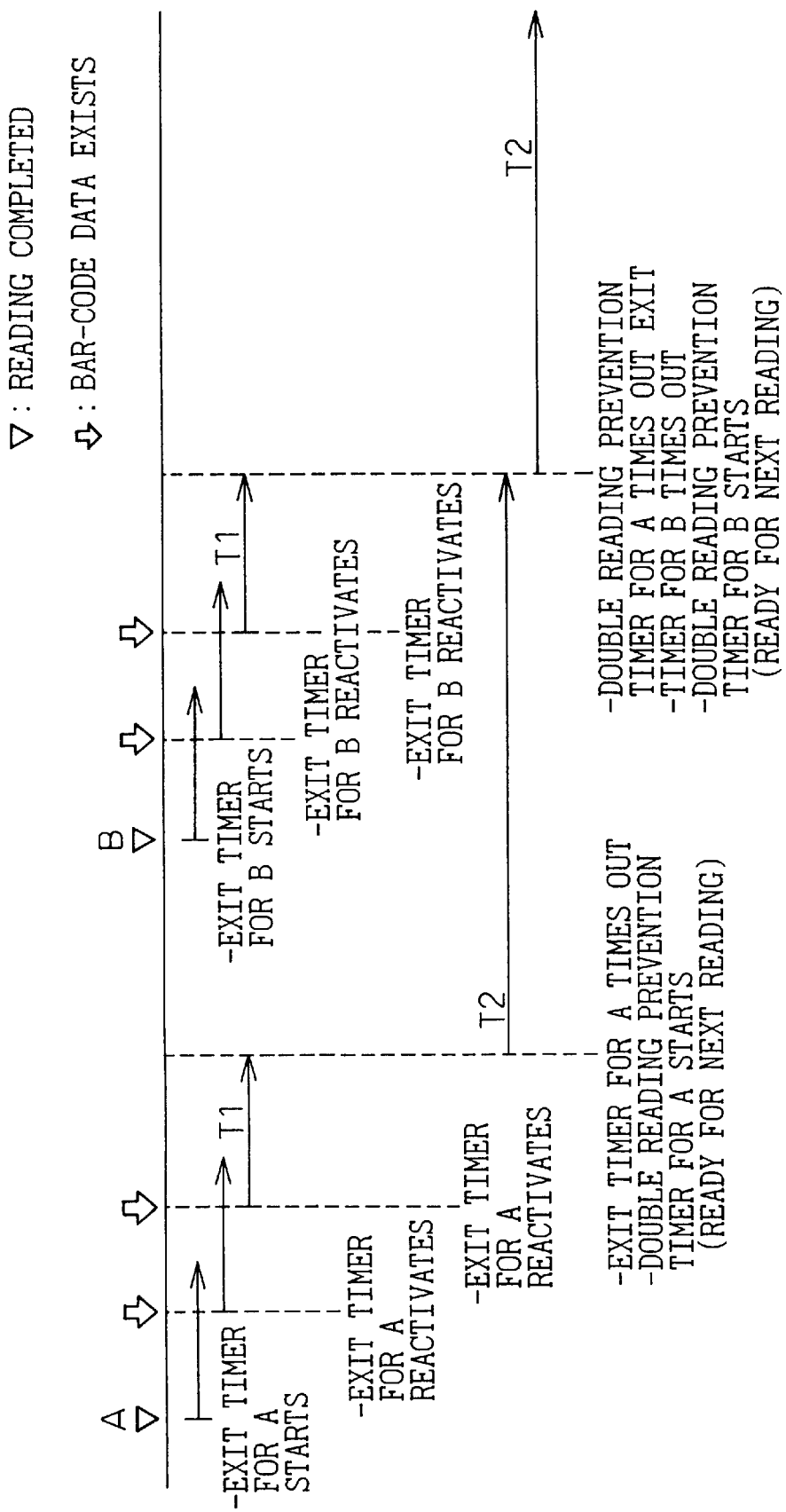
FIG. 2 is a time chart when the bar-code reader is operating normally.

An operation for reading bar codes from bar-code labels attached to products or like items by using the bar-code reader 102 shown FIG. 1 will be described below with reference to the time chart of FIG. 2. FIG. 2 shows the case where the bar-code reader 102 first reads a bar code A attached to a product, and then a bar code B different from the bar code A.

When the bar code A is brought into the reading area of the optical device 103, the optical device 103 receives light reflected from the bar-code label, the optical received signal then undergoes processing within the bar-code reader 102, such as conversion to digital form, and the bar-code data recognized as the complete bar code is decoded. Here, if the bar-code reading operation is continuing from the preceding reading operation, a judgement will be made, from the viewpoint of double reading prevention, as to whether the currently read bar code is identical to the just previously read bar cod; in the illustrated example, however, since the reading operation for the bar code A is the first reading operation, it is determined that a bar code data A is not identical to the just previously bar code data. Then, the bar-code reader 102 transmits the bar-code data A to the POS station terminal 101, whereupon the speaker contained in the bar-code reader 102 is caused to produce a short beep tone signifying that the bar-code data has been transmitted to the POS station terminal 101. The POS station terminal 101 performs processing for billing based on the received bar-code data.

However, there can occur cases where the bar-code label is still within the reading area of the optical device 103 after the reading of the bar code A is completed. In view of this, provisions are made to start the next reading operation after determining that the bar-code label has exited the reading area. If the bar code is still within the reading area of the optical device 103, the optical device 103 receives a seemingly barcode-like optical signal or an optical signal of incomplete bar-code data; as long as such an optical signal is being received, it is determined that the bar-code label is still within the reading area. In FIG. 2, open arrows indicate that bar-code exists. A bar-code exit timer is provided to check whether the bar-code label has exited the reading area. The exit timer is activated when bar-code data or the like due to optical signals is detected. If such data is not detected during the time period T1 of the exit timer, the exit timer times out; it is then determined that the bar code A has exited the reading area, and the bar-code reader 102 is now ready for the next reading operation. Then the double reading prevention timer is started. This is to prevent the same bar code from being read and transmitted to the POS station terminal 101 during the predetermined time period T2 of the double reading prevention timer; if the same bar code data is read during the predetermined time period T2, the bar-code data thus read is discarded. If the same bar code data is read after the predetermined time period T2 has elapsed, the bar-code data of the thus read bar code is transmitted to the POS station terminal 101.

Next, a description will be given of the case where the bar-code reader 102 reads the bar code B of a product different from the product carrying the bar code A. If the reading of the bar code B is sufficiently separated in time from the reading of the bar code A, the reading operation is the same as the first reading operation, that is, the reading operation for the bar code B is the same as the reading operation for the bar code A. In the example shown in FIG. 2, the reading operation for the bar code B is started within the time period T2, that is, when the double reading prevention timer for the bar code A is ON. The bar code B on the bar-code label attached to that different product is read by the optical device 103 in the bar-code reader 102, and the bar-code data is decoded. Then, the bar-code data B is compared with the bar-code data of the just previously read bar code, i.e., the bar code A; since they are not identical, the bar-code data B is transmitted to the POS station terminal 101, whereupon the speaker contained in the bar-code reader 102 is caused to produce a short beep tone notifying that the bar-code data has been transmitted to the POS station terminal 101. Thereafter, if the bar code B is still within the reading area, the bar-code exit timer is activated, the same as in the case of the bar code A, and when it is determined, at the end of the time period T1, that the bar code B has exited, the double reading prevention timer is started for the bar code B, the bar-code reader 102 thus being set ready for the next bar-code reading operation.

Figure 3:
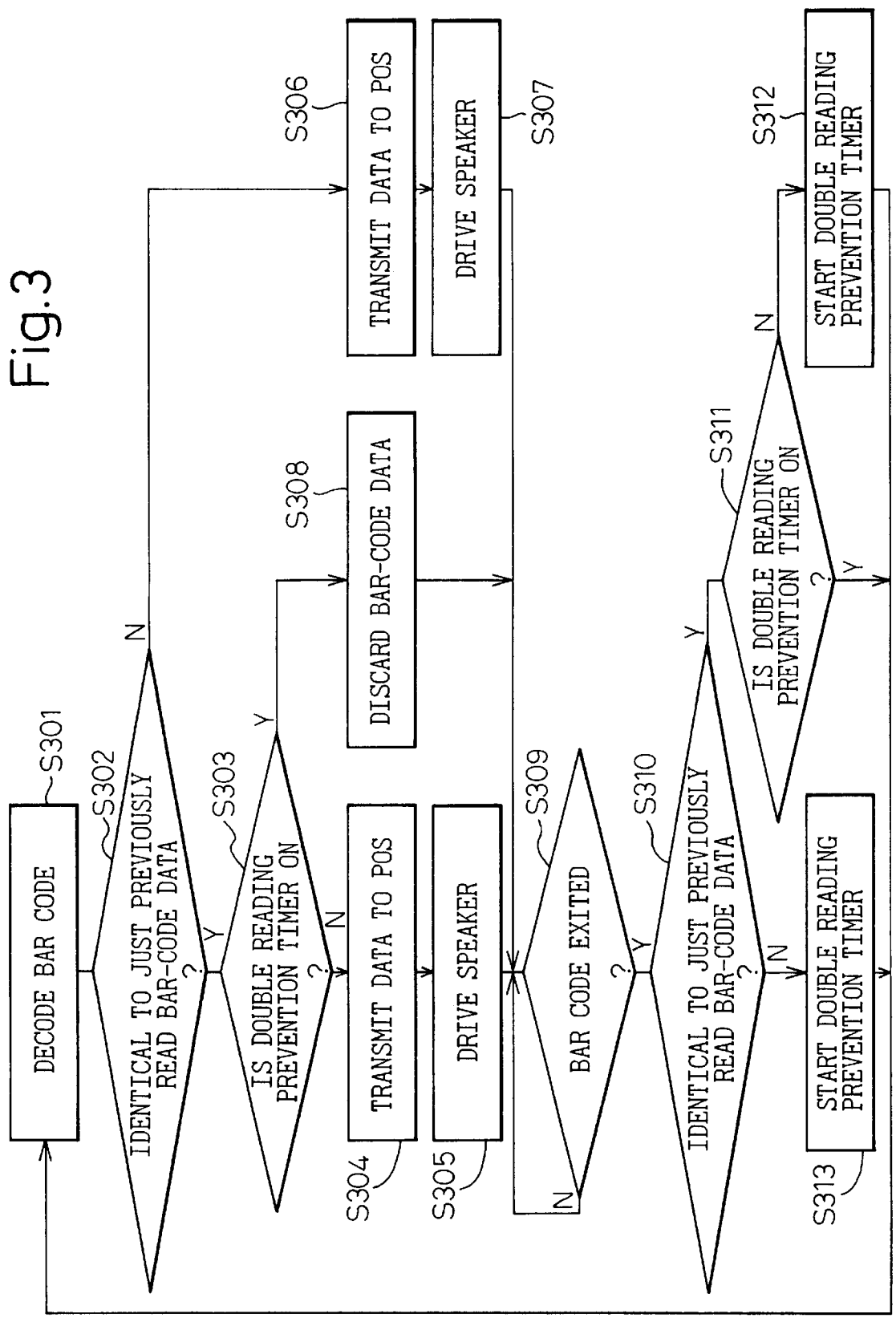
FIG. 3 is a flowchart illustrating the operation of the bar-code reader shown in FIG. 1.

FIG. 3 shows a flowchart illustrating the reading operation of the bar-code reader 102 in conjunction with the time chart shown in FIG. 2. The reading operation will be described with reference to the flowchart.

A bar-code label attached to a product or a like item is scanned by the optical device 103 contained in the bar-code reader 102 to read the bar code, and the bar-code data of the thus read bar code is decoded (S301). A decision is made as to whether the bar code data thus read is identical to the just previously read bar code data (S302). If the currently read bar code data is not identical to the just previously read bar code data, the currently read bar code data is transmitted to the host (CPU) of the POS station terminal 101, that is, the POS station host (S306), and at the same time, the speaker contained in the bar-code reader 102 is caused to produce a short beep tone to notify that the bar-code data has been transmitted (S307). On the other hand, if, in step S302, the currently read bar code data is identical to the just previously read bar code data (Y), then a decision is made as to whether the time at which the current bar code data was read falls within the ON period of the double reading prevention timer for the previous bar-code reading (S303). The double reading prevention timer is provided to prevent double reading of a bar code; that is, after a bar code is read, if the same bar code data is read again within the predetermined time period T2, the bar-code data thus read is disregarded. If the above time falls within the ON period of the timer, and if the currently read bar-code data is identical to the previously read bar-code data, the currently read bar-code data is discarded (S308). If it is not within the ON period of the double reading prevention timer, the currently read bar-code data is transmitted to the POS station host (S304), and at the same time, the speaker contained in the bar-code reader 102 is caused to produce a short beep tone to notify that the bar-code data has been transmitted (S305).

Next, a decision is made as to whether the current bar-code label has exited the reading area of the optical device 103 (S309). For this decision, the bar-code exit timer is used; that is, after waiting for the time period T1 to elapse from the detection of the bar-code data, if bar-code data or the like relating to optical signals is not detected, then it is decided that the current bar-code label has exited the reading area. For example, when bar-code data is detected, it is decided that the bar-code label is still within the reading area, and the bar-code exit timer is reactivated each time the bar-code data is detected. When it is finally confirmed that the bar-code label has exited the reading area, a decision is made as to whether the current bar code data is identical to the just previously read bar code data (S310). If they are not identical to each other, the double reading prevention timer is started (S313), and the bar-code reader 102 is thus set ready for the next bar-code reading. If they are identical, and if the double reading prevention timer is ON at the time of the decision, the bar-code reader 102 is ready for the next bar-code reading (S311). If the double reading prevention timer is not ON, the timer is started (S312), thus setting the bar-code reader 102 ready for the next bar-code reading.

Referring next to the time chart of FIG. 4, a description will be given of the case in which, after reading the bar code A, the same bar code A' is read again.

When reading the bar code A for the first time, the operation is the same as that shown in FIG. 2. After reading the bar code data A, the operator tries to read the same bar code data A' during the ON period of the double reading prevention timer activated for the bar code A (S302, S303). The instant that the bar code data A' is read, the bar-code data A' is discarded, since the currently read bar code data A' is identical to the just previously read bar code data A (S308). If the bar code A' is still within the reading area, the bar-code exit timer starts. However, since, at this time, the operator does not know that the bar-code data A' has been discarded, the operator continues to perform the reading operation for the bar code A' in the bar-code reading area, trying to make the bar-code reader 102 read the bar code A'.

As a result, as previously described, the bar-code exit timer is reactivated repeatedly, because the bar code A' continues to stay within the bar-code reading area before the timeout of the bar-code exit timer. However, since the bar-code data of the bar code A' was discarded, even when the double reading prevention timer has timed out for the bar code A, the operator continues to repeat the reading operation for the bar code A' until the bar code A' is brought outside the reading area.

As previously described, the bar-code reader is equipped with the bar-code exit timer and double reading prevention timer functions to prevent the bar code of the same product from being decoded twice, so that if a bar code of the same product is decoded during the time period $T_2$, the decoded data is discarded.

Figure 4:
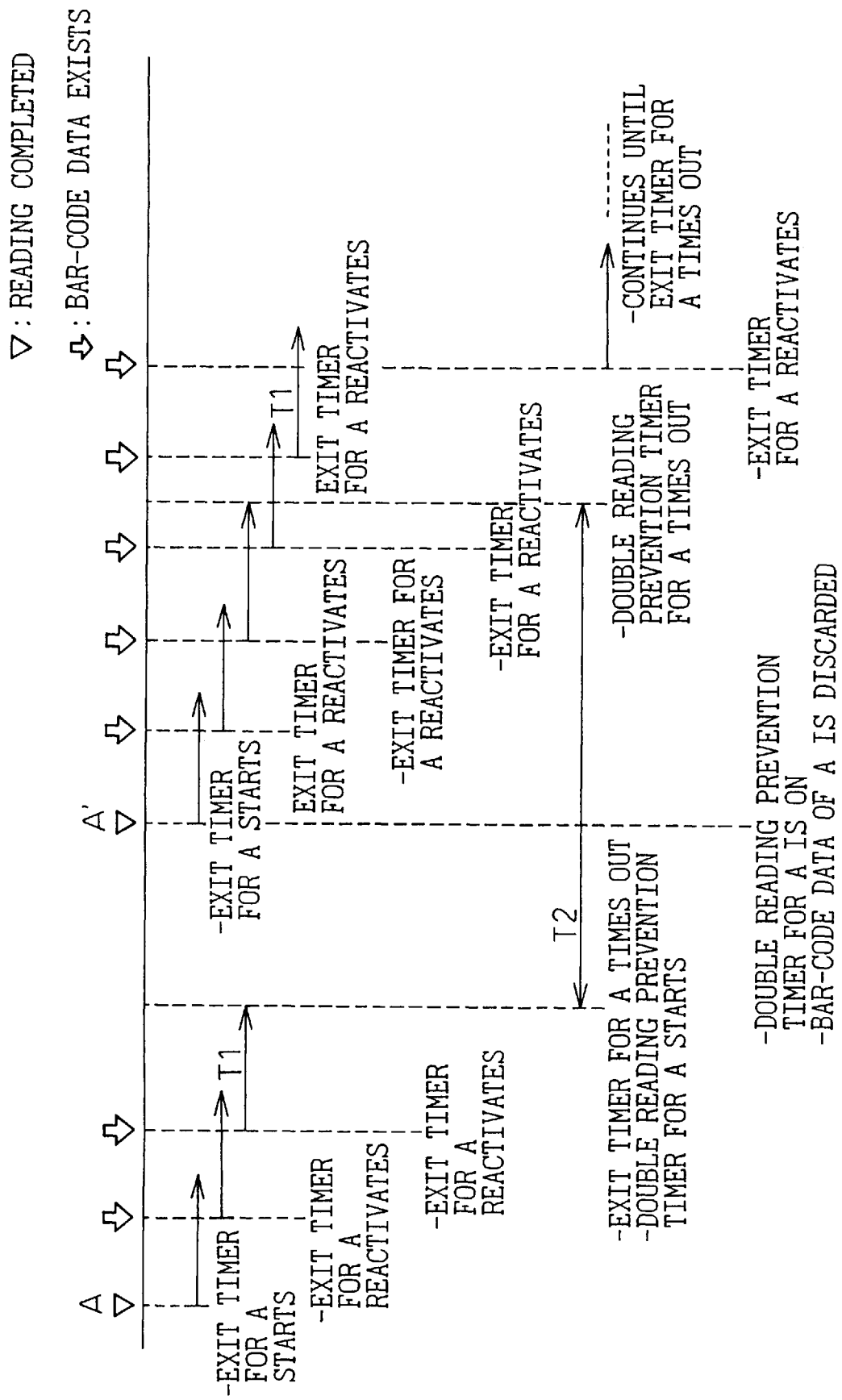
FIG. 4 is a time chart when the bar-code reader is operating abnormally.

When reading the bar code B by the bar-code reader 102 after reading the bar code A, as shown in FIG. 2, since the bar codes are different from each other, no problems occur in the operator's bar-code reading operation, but when trying to read the same bar code data A' after reading the bar code A, as shown in FIG. 4, the above-described feature poses a problem in operation.

With the above-mentioned embodiment using the double reading prevention feature of the bar-code reader, when reading the same bar code twice, since the same bar code data is discarded for reading for a certain period of time, the operator thinks at this time that the reading sensitivity is poor, and retries the reading operation.

When the same bar code is read twice, the second bar-code data is discarded, but the operator is not aware of it and may keep holding the bar code within the reading area by misunderstanding the situation as a read failure. As a result, the exit timer is reactivated repeatedly, forcing the operator to perform unnecessary operations. This imposes stress on the operator, the operator not knowing what to do to correct the situation.

Further, when the same product is scanned continuously, since there is no knowing whether the currently scanned product is the same one previously scanned, the operator has to look at the display, etc. for confirmation; this has also imposed stress on the operator.

In view of the above situation, the present invention alleviates operator stress in a bar-code reading operation by notifying that the double read bar-code data has been discarded, and making provisions to make the operator realize what to do next when the same product as the immediately previous product is scanned during the time period of double reading prevention activated to prevent double reading of the same product.

The preferred embodiment of the present invention will now be described with reference to relevant drawings.

Figure 5:
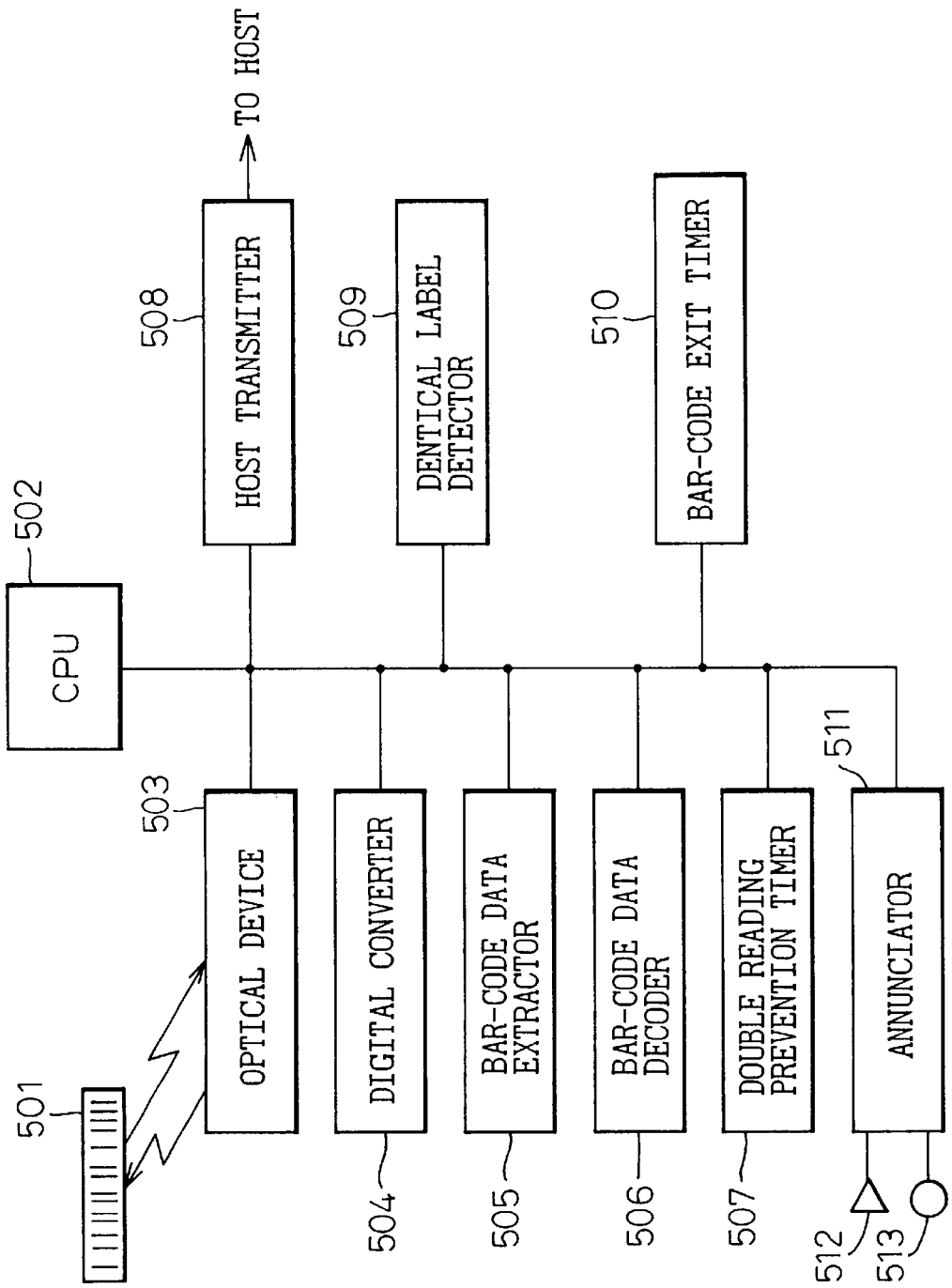
FIG. 5 is a block diagram of the bar-code reader according to the preferred embodiment of the present invention.

The configuration of the bar-code reader 102 according to the present invention will be described with reference to FIG. 5. In FIG. 5, the steps corresponding to those in FIG. 2 are assigned corresponding numbers. The bar-code reader 102 has a CPU 502 which controls various operations. The CPU 502 is connected via a bus to an optical device 503, a digital converter 504, a bar-code data extractor 505, a bar-code data decoder 506, a double reading prevention timer 507, an identical label detector 509, a bar-code exit timer 510, and an annunciator 511. The CPU is also connected to the POS station terminal 101 via a host transmitter 508. The annunciator 511 has an annunciating means which emit sound or light; in FIG. 5, it is so connected as to drive a speaker 512 and an LED 513 and is capable of driving the speaker 512 or the LED 513 at different frequencies. Besides the LED, an electric bulb or the like can be used as the light-emitting means. The optical device 503, which is used to read a bar code on a bar-code label 501 attached to a product or like item, comprises: a light source for emitting a laser beam or the like; and a light detector for receiving light reflected from the bar-code label, and for converting it into an electrical signal.

Figure 6:
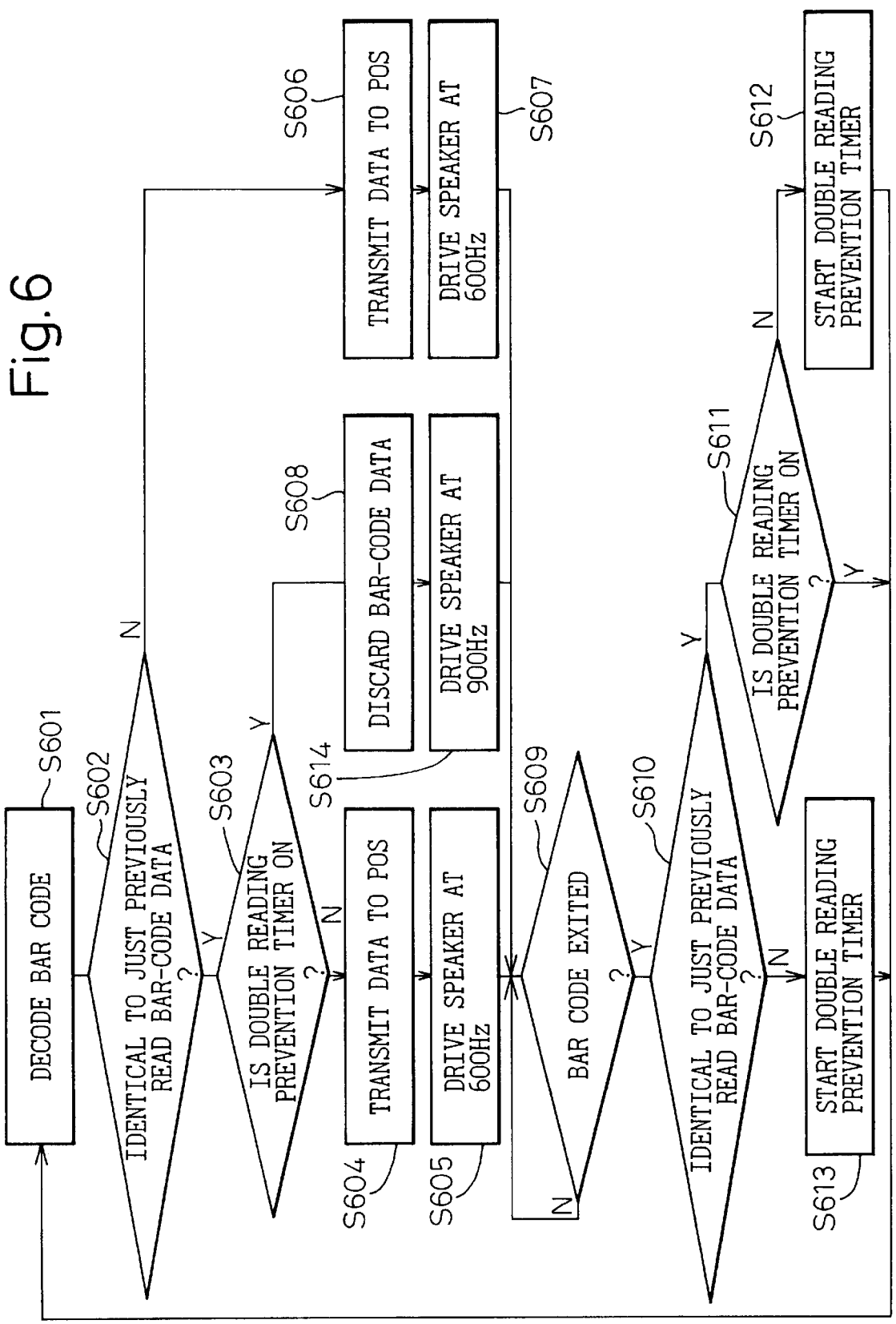
FIG. 6 is a flowchart illustrating the operation of the bar-code reader according to the preferred embodiment of the present invention.

The operation of the bar-code reader 102 according to the present invention shown in FIG. 5 will be described with reference to FIG. 6.

The bar code is read by the light detector of the optical device 503 contained in the bar-code reader 102 (S601). The bar-code label 501 attached to the product or like item is scanned, and light reflected from the bar-code label 501 is received; the received signal is processed in the digital converter 504, and the bar-code data is decoded in the bar-code data decoder 506. Next, using the identical label detector 509, a decision is made as to whether the currently read bar code data is identical to the just previously read bar code data (S602). If the currently read bar code data is not identical to the just previously read bar code data, the currently read bar code data is transmitted to the host of the POS station terminal 101 via the host transmitter 508 (S606); at the same time, the speaker 512 contained in the bar-code reader 102 is caused to produce a sound (for example, at a frequency of 600 Hz) to notify that the bar-code data has been transmitted to the POS station terminal 101 (S607).

On the other hand, if, in step S602, the currently read bar code data is identical to the just previously read bar code data (Y), then a decision is made as to whether the time at which the current bar code data was read falls within the ON period of the double reading prevention timer 507 for the just previously bar-code reading (S603). If that time falls within the ON period of the timer 507, the currently read bar-code data is discarded (S608). In the bar-code reader 102, a speaker 512 is provided that is driven at a different frequencies by the annunciator 511, and when the data of the currently read bar code data is discarded (S608), the speaker 512 is caused to produce a sound of a frequency (for example, 900 Hz) higher the sound produced in steps S605 and S607, to notify the operator that the currently read bar code data has been discarded (S614).

If the double reading prevention timer 507 is not ON, the currently read bar-code data is transmitted to the host of the POS station terminal 101 via the host transmitter 508 (S604); at the same time, the speaker 512 contained in the bar-code reader 102 is caused to produce a sound (for example, at a frequency of 600 Hz) to notify the operator that the bar-code data has been transmitted to the POS station terminal 101 (S605).

The remaining operation steps S609 to S613 of the bar-code reader 102 are the same as the corresponding operation steps S309 to S313 in the flowchart shown in FIG. 3.

The annunciating means for notifying the operator of the transmission or discarding of the bar-code data has been described as driving the speaker 512 by changing the frequency of sound between the two types of notification, but since the annunciator 511 is also equipped with the LED 513, the speaker 512 may be used for one type of notification and the LED 513 for the other type. Alternatively, differently colored LEDs may be used for the different types of notification. In the case of the notification by color, other light-emitting devices, such as miniature lamps, may be used instead of the LEDS.

The operation of the bar-code reader 102 in steps S608 and S614 (FIG. 6) will be described with reference to the time chart of FIG. 4. When first reading the bar code A on the bar-code label 501 attached to the product, the operation of the bar-code reader 102 is the same as that shown in FIG. 3. After reading the bar code A, the operator tries to read the same bar code A' during the ON period of the double reading prevention timer 507 activated for the bar code A (S602, S603). The instant that the bar code A' is read, the bar-code data A' is discarded, since the currently read bar code data A' is identical to the just previously read bar code data A (S608). However, at this time, the annunciator 511 drives the speaker 512 to produce a sound of a frequency higher than that produced in steps S605 and S607 (S614), and thus allows the operator to know that the bar-code data A' has been discarded. The operator then recognizes that the bar code A' cannot be read at this time, and realizes that the bar code Al should be brought outside the reading area.

When the operator brings the bar code A' outside the reading area, the bar-code exit timer is not reactivated but is allowed to expire. The operator then prevents the reading of the bar code A' until the double reading prevention timer 507 for the bar code A times out. After the timeout, the bar code A' can be read by restarting the reading operation.

In the present invention, the annunciating means has been described as being driven by the annunciator contained in the bar-code reader to notify that the bar-code data has been discarded, but this annunciating means may be provided in the POS station terminal and may be driven from the annunciator contained in the bar-code reader.

According to the bar-code reader and controlling method therefor of the present invention, if the same product as the immediately previous product is scanned during the ON period of the double reading prevention timer activated to prevent double reading of the same product, the annunciating means contained in the bar-code reader warns the operator that the same bar code has been scanned; this feature also allows the operator to know that the bar-code data has been discarded during the bar-code reading operation, and realize that the same product has been scanned.

Further, since the discarding of the bar-code data is signaled by a sound or like means, the operator need not perform the reading operation over and over again, but only needs to resume the operation after waiting for a short while which does not present any problem in operation. In the meantime, the operator can handle other products for processing; this contributes to alleviating operator stress and enhancing operational efficiency.

What is claimed is:

1. A bar-code reader, comprising:

an optical device for emitting light, and for receiving a signal in a form of light reflected from a bar-code label;

a signal converter for reading said signal from said optical device and converting said signal into bar-code data;

a bar-code data decoder for decoding the bar-code data read by said signal converter;

a transmitter for transmitting said bar-code data to a station host;

an identical label detector for detecting, through comparison, whether said bar-code data from said signal converter is identical to a just previously read bar-code data;

a double reading prevention timer as a basis to determine whether to discard any double reading of said bar-code data within a predetermined time period; and an annunciator for producing a first notification when a first reading of said bar-code data is transmitted to said station host and a second notification when a double reading of said bar-code data is discarded within said predetermined time period.

2. A bar-code reader according to claim 1, wherein said annunciator is configured to produce said first notification and said second notification in a distinguishable manner.

3. A bar-code reader according to claim 2, wherein said annunciator produces said first and second notification by producing different sounds.

4. A bar-code reader according to claim 2, wherein said annunciator produces said first and second notification by emitting different light colors.

5. A bar-code reader according to claim 2, wherein said annunciator produces one of said first and second notifications in the form of sound and the other thereof in the form of light.

6. A bar-code reader according to claim 1, further comprising a bar-code exit detector, wherein said double reading prevention timer is started when it is determined that said bar code has exited a reading area.

7. A method of controlling bar-code reading, comprising the steps of:

reading a bar code from a bar-code label;

comparing said bar-code with a just previously read bar-code and, if they are identical, determining whether a double reading prevention timer is ON;

if said double reading prevention timer is not ON, then transmitting said bar-code to an external device while, at the same time, producing a first notification signifying that said bar-code has been transmitted, and if said double reading prevention timer is ON, then discarding said bar-code while, at the same time, producing a second notification signifying that said bar-code has been discarded.

* * * * *